(12) United States Patent
Cova et al.

(10) Patent No.: US 11,496,494 B2
(45) Date of Patent: Nov. 8, 2022

(54) SYSTEMS AND METHODS FOR DETECTING ANOMALOUS BEHAVIORS BASED ON TEMPORAL PROFILE

(71) Applicant: Lastline, Inc., Santa Barbara, CA (US)

(72) Inventors: Marco Cova, London (GB); Corrado Leita, Twickenham (GB); Luukas Larinkoski, London (GB)

(73) Assignee: VMware, Inc., Palo Alto, CA (US)

( * ) Notice: Subject to any disclaimer, the term of this patent is extended or adjusted under 35 U.S.C. 154(b) by 400 days.

(21) Appl. No.: 16/717,240

(22) Filed: Dec. 17, 2019

(65) Prior Publication Data

US 2021/0185068 A1 Jun. 17, 2021

(51) Int. Cl.
*H04L 9/40* (2022.01)
*H04L 43/067* (2022.01)
*H04L 69/16* (2022.01)
*H04L 45/00* (2022.01)
*H04L 45/02* (2022.01)

(52) U.S. Cl.
CPC ........ *H04L 63/1425* (2013.01); *H04L 43/067* (2013.01); *H04L 45/02* (2013.01); *H04L 45/38* (2013.01); *H04L 45/566* (2013.01); *H04L 63/102* (2013.01); *H04L 63/1416* (2013.01); *H04L 63/1433* (2013.01); *H04L 63/20* (2013.01); *H04L 69/16* (2013.01)

(58) Field of Classification Search
None
See application file for complete search history.

(56) References Cited

U.S. PATENT DOCUMENTS

| | | | |
|---|---|---|---|
| 2016/0219065 A1* | 7/2016 | Dasgupta | H04L 63/1441 |
| 2017/0279694 A1* | 9/2017 | Sartran | H04L 41/14 |
| 2017/0279698 A1* | 9/2017 | Sartran | H04L 43/0823 |
| 2020/0052981 A1* | 2/2020 | Pandey | H04L 43/50 |
| 2020/0099709 A1* | 3/2020 | Vasseur | H04L 45/742 |
| 2020/0313979 A1* | 10/2020 | Kumaran | H04L 41/16 |
| 2020/0396232 A1* | 12/2020 | Lee | G06F 11/323 |
| 2021/0158183 A1* | 5/2021 | Lohia | G06N 20/20 |

* cited by examiner

*Primary Examiner* — Joseph P Hirl
*Assistant Examiner* — Hassan Saadoun
(74) *Attorney, Agent, or Firm* — Fish & Richardson P.C.

(57) ABSTRACT

The present disclosure is directed to a method of detecting anomalous behaviors based on a temporal profile. The method can include collecting, by a control system comprising a processor and memory, a set of network data communicated by a plurality of network nodes over a network during a time duration. The method can include identifying, by the control system, one or more seasonalities from the set of network data. The method can include generating, by the control system, a temporal profile based on the one or more identified seasonalities. The method can include detecting, by the control system and based on the temporal profile, an anomalous behavior performed by one of the plurality of network nodes. The method can include identifying, by the control system and based on the temporal profile, a root cause for the anomalous behavior.

20 Claims, 4 Drawing Sheets

```
                    350                          362
            364 ┌───┴──────────────────────────────┴─────────────┐
                │ """alert tcp $HOME_NET any -> $EXTERNAL_NET $HTTP_PORTS │
                │ (msg:"Alert: (Dropper) Pushdo";                │
            368 │ flow:to_server,established; content:"POST"; http_method; │
                │ urilen:39; content:"/?ptrxcz "; http_uri;      │
            372 │ pcre:"/^\/\?ptrxcz_[a-z0-9A-Z]{30}$/U";         │
                │ reference:md5,38f1e2b79be4e789be80192b7f96e20c; │
                │ classtype:trojan-activity; sid:1001626; rev:1; )""" │
                └────────┬───────────────┬──────────────┬────────┘
                         382             384            375
```

FIG. 3

SYSTEMS AND METHODS FOR DETECTING ANOMALOUS BEHAVIORS BASED ON TEMPORAL PROFILE

BACKGROUND

The present invention relates generally to the field of computer security. In general, a computing device may have one or more vulnerabilities that can be leveraged by malicious code to compromise the computing device. Malicious code may also be introduced onto a computing device by deceiving a user. Malicious code running on a compromised machine may install additional malware components. Computer security is improved through the detection of malicious software ("malware") that either uses malicious code to exploit vulnerabilities (or deceive users) and repurpose infected computers or performs malicious actions once installed on a compromised host. Once malware is detected and the exploits are understood, security systems may be designed to recognize and block the malware and the vulnerabilities may be patched.

BRIEF SUMMARY

In one aspect, the present disclosure is directed to a method for detecting anomalous behaviors based on a temporal profile. The method can include collecting, by a control system comprising a processor and memory, a set of network data communicated by a plurality of network nodes over a network during a time duration. The method can include identifying, by the control system, one or more seasonalities from the set of network data. The method can include generating, by the control system, a temporal profile based on the one or more identified seasonalities. The method can include detecting, by the control system and based on the temporal profile, an anomalous behavior performed by one of the plurality of network nodes. The method can include identifying, by the control system and based on the temporal profile, a root cause for the anomalous behavior.

In some embodiments, the method can further include switching, by the control system, from a data collection mode to an anomaly detection mode in response to the generation of the temporal profile.

In some embodiments, the set of network data includes at least one of: a plurality of raw data packets over the network, respective source IP addresses of the plurality of raw data packets, respective destination IP addresses of the plurality of raw data packets, respective source TCP ports of the plurality of raw data packets, respective destination TCP ports of the plurality of raw data packets, respective source UDP ports of the plurality of raw data packets, respective destination UDP ports of the plurality of raw data packets, and respective data sizes of the plurality of raw data packets.

In some embodiments, the method can further include segmenting, by the control system, the time duration into a plurality of monitoring time periods. The method can further include grouping, by the control system based on a plurality of timestamps of the set of network data, the set of network data into respective subsets of the plurality of monitoring time periods. The method can further include determining, by the control system, the one or more seasonalities based on an occurrence rate associated with each of the subset of the monitoring time periods.

In some embodiments, the method can further include determining, by the control system, a network flow associated with the anomalous behavior using highest magnitude interaction analysis. In some embodiments, the method can further include identifying, by the control system, the network nodes associated with the network flow.

In some embodiments, the method can further include collecting, by the control system, a second set of network data communicated by the plurality of network nodes over the network during a second time duration. In some embodiments, the method can further include identifying, by the control system, one or more detection mode seasonalities from the second set of network data. In some embodiments, the method can further include comparing, by the control system, the detection mode seasonalities with the temporal profile to calculate a confidence margin. In some embodiments, the method can further include detecting, by the control system, an anomalous behavior based on the calculated confidence margin exceeding a predetermined threshold.

In some embodiments, the method can further include identifying, by the control system, from the set of network data, a network communication between two network nodes, wherein at least one of the network nodes is on a list of known malicious network nodes. In some embodiments, the method can further include identifying, by the control system, one or more malicious seasonalities of the identified network communication. In some embodiments, the method can further include generating, by the control system, a malicious temporal profile based on the one or more identified malicious seasonalities. In some embodiments, the method can further include comparing, by the control system, the one or more seasonalities to the malicious temporal profile to determine a malicious network communication with an unknown network node. In some embodiments, the method can further include adding, by the control system, the unknown network node to the list of known malicious network nodes.

In some embodiments, the method can further include identifying, by the control system, from the set of network data, a network communication between two network nodes, wherein at least one of the network nodes is on a list of known trusted network nodes. In some embodiments, the method can further include identifying, by the control system, one or more trusted seasonalities of the identified network communication. In some embodiments, the method can further include generating, by the control system, a trusted temporal profile based on the one or more identified trusted seasonalities. In some embodiments, the method can further include comparing, by the control system, the one or more seasonalities to the trusted temporal profile to determine a trusted network communication with an unknown network node. In some embodiments, the method can further include adding, by the control system, the unknown network node to the list of known trusted network nodes.

In another aspect, the present disclosure is directed to a computing device configured to detect anomalous behaviors based on a temporal profile. The computing device includes a memory, and one or more processors operatively coupled to the memory. The one or more processors are configured to collect a set of network data communicated by a plurality of network nodes over a network during a time duration. The one or more processors are configured to identify one or more seasonalities from the set of network data. The one or more processors are configured to generate a temporal profile based on the one or more identified seasonalities. The one or more processors are configured to detect, based on the temporal profile, an anomalous behavior performed by one of the plurality of network nodes. The one or more processors are configured to identify, based on the temporal profile, a root cause for the anomalous behavior.

In some embodiments, the one or more processors are further configured to switch from a data collection mode to an anomaly detection mode in response to the generation of the temporal profile.

In some embodiments, the set of network data includes at least one of: a plurality of raw data packets over the network, respective source IP addresses of the plurality of raw data packets, respective destination IP addresses of the plurality of raw data packets, respective source TCP ports of the plurality of raw data packets, respective destination TCP ports of the plurality of raw data packets, respective source UDP ports of the plurality of raw data packets, respective destination UDP ports of the plurality of raw data packets, and respective data sizes of the plurality of raw data packets.

In some embodiments, the one or more processors are further configured to segment the time duration into a plurality of monitoring time periods. The one or more processors are further configured to group, based on a plurality of timestamps of the set of network data, the set of network data into respective subsets of the plurality of monitoring time periods. The one or more processors are further configured to determine the one or more seasonalities based on an occurrence rate associated with each of the subset of the monitoring time periods.

In some embodiments, the one or more processors are further configured to determine a network flow associated with the anomalous behavior using highest magnitude interaction analysis. In some embodiments, the one or more processors are further configured to identify the network nodes associated with the network flow.

In some embodiments, the one or more processors are further configured to collect a second set of network data communicated by the plurality of network nodes over the network during a second time duration. In some embodiments, the one or more processors are further configured to identify one or more detection mode seasonalities from the second set of network data. In some embodiments, the one or more processors are further configured to compare the detection mode seasonalities with the temporal profile to calculate a confidence margin. In some embodiments, the one or more processors are further configured to detect an anomalous behavior based on the calculated confidence margin exceeding a predetermined threshold.

In some embodiments, the one or more processors are further configured to identify, from the set of network data, a network communication between two network nodes, wherein at least one of the network nodes is on a list of known malicious network nodes. In some embodiments, the one or more processors are further configured to identify one or more malicious seasonalities of the identified network communication. In some embodiments, the one or more processors are further configured to generate a malicious temporal profile based on the one or more identified malicious seasonalities. In some embodiments, the one or more processors are further configured to compare the one or more seasonalities to the malicious temporal profile to determine a malicious network communication with an unknown network node. In some embodiments, the one or more processors are further configured to add the unknown network node to the list of known malicious network nodes.

In some embodiments, the one or more processors are further configured to identify, from the set of network data, a network communication between two network nodes, wherein at least one of the network nodes is on a list of known trusted network nodes. In some embodiments, the one or more processors are further configured to identify one or more trusted seasonalities of the identified network communication. In some embodiments, the one or more processors are further configured to generate a trusted temporal profile based on the one or more identified trusted seasonalities. In some embodiments, the one or more processors are further configured to compare the one or more seasonalities to the trusted temporal profile to determine a trusted network communication with an unknown network node. In some embodiments, the one or more processors are further configured to add the unknown network node to the list of known trusted network nodes.

In yet another aspect, the present disclosure is directed to a non-transitory computer readable medium storing program instructions. The program instructions cause one or more processors to collect a set of network data communicated by a plurality of network nodes over a network during a time duration. The program instructions cause the one or more processors to identify one or more seasonalities from the set of network data. The program instructions cause the one or more processors to generate a temporal profile based on the one or more identified seasonalities. The program instructions cause the one or more processors to detect, based on the temporal profile, an anomalous behavior performed by one of the plurality of network nodes. The program instructions cause the one or more processors to identify, based on the temporal profile, a root cause for the anomalous behavior.

In some embodiments, the program instructions cause the one or more processors to collect a second set of network data communicated by the plurality of network nodes over the network during a second time duration. In some embodiments, the program instructions cause the one or more processors to identify one or more detection mode seasonalities from the second set of network data. In some embodiments, the program instructions cause the one or more processors to compare the detection mode seasonalities with the temporal profile to calculate a confidence margin. In some embodiments, the program instructions cause the one or more processors to detect an anomalous behavior based on the calculated confidence margin exceeding a predetermined threshold.

In some embodiments, the program instructions cause the one or more processors to identify, from the set of network data, a network communication between two network nodes, wherein at least one of the network nodes is on a list of known malicious network nodes. In some embodiments, the program instructions cause the one or more processors to identify one or more malicious seasonalities of the identified network communication. In some embodiments, the program instructions cause the one or more processors to generate a malicious temporal profile based on the one or more identified malicious seasonalities. In some embodiments, the program instructions cause the one or more processors to compare the one or more seasonalities to the malicious temporal profile to determine a malicious network communication with an unknown network node. In some embodiments, the program instructions cause the one or more processors to add the unknown network node to the list of known malicious network nodes.

In some embodiments, the program instructions cause the one or more processors to identify, from the set of network data, a network communication between two network nodes, wherein at least one of the network nodes is on a list of known trusted network nodes. In some embodiments, the program instructions cause the one or more processors to identify one or more trusted seasonalities of the identified network communication. In some embodiments, the program instructions cause the one or more processors to generate a trusted temporal profile based on the one or more identified trusted seasonalities. In some embodiments, the program instructions cause the one or more processors to compare the one or more seasonalities to the trusted temporal profile to determine a trusted network communication with an unknown network node. In some embodiments, the program instructions cause the one or more processors to add the unknown network node to the list of known trusted network nodes.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIG. 3 is a diagrammatic view of one embodiment of a traffic model, according to an exemplary embodiment.

DETAILED DESCRIPTION

Figure 1:
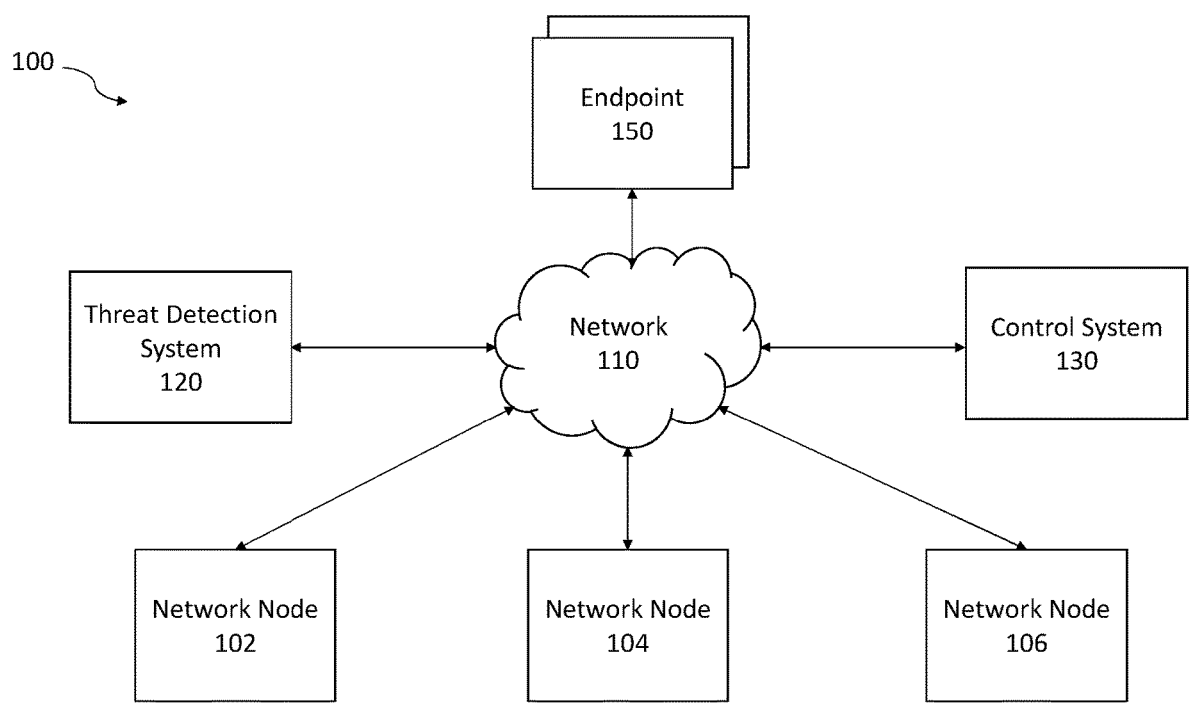
FIG. 1 is a block diagram illustrating one embodiment of computing systems in a network environment, according to an exemplary embodiment.

Following below are more detailed descriptions of various concepts related to, and embodiments of, methods, apparatuses, and systems introduced above. The various concepts introduced above and discussed in greater detail below may be implemented in any of numerous ways, as the concepts described are not limited to any particular manner of embodiment. Examples of specific embodiments and applications are provided primarily for illustrative purposes.

In general, a computing device connected to a data network may have one or more vulnerabilities that can be leveraged to compromise the computing device. Vulnerabilities include unintentional program flaws, such as a buffer with inadequate overrun prevention, and intentional holes, such as an undisclosed programmatic backdoor. Malicious code can, and has been, developed to exercise these various vulnerabilities to yield the execution of code under the control of an attacker. Malicious code implemented to target a particular vulnerability is sometimes referred to as an exploit. For example, malicious code may access an apparently benign interface and cause a buffer overflow resulting in the placement of unauthorized code in the execution stack where it may be run with elevated privileges. Such an attack could execute an exploit causing the buffer overflow and enabling an unauthorized party to obtain administrative control over the computing device. Commonly, the exploit code downloads additional components of the malware, and modifies the operating system to become persistent. The computing device, now compromised, may be used for further attacks on other computing devices in the network or put to other malicious purposes, such as the collection and exfiltration of sensitive data.

Some compromised machines are configured to communicate with a remote endpoint, e.g., a command and control ("C&C") system. For example, a compromised machine may check in with a C&C host to receive instructions for how the compromised machine should be used (e.g., to send unsolicited e-mails, i.e., "spam," or to participate in a distributed denial-of-service attack, i.e., "D-DOS"). A compromised machine is sometimes referred to as a "Bot" or a "Zombie" machine. A network of these machines is often referred to as a "botnet."

Malicious code may be embodied in malicious software ("malware"). As used herein, malware includes, but is not limited to, computer viruses, worms, Trojans, rootkits, and spyware. Malware may generally include any software that circumvents user or administrative controls. Malicious code may be created by an individual for a particular use. Exploits may be created to leverage a particular vulnerability, and then adopted for various uses, e.g., in scripts or network attacks. Generally, because new forms of malicious behavior are designed and implemented on a regular basis, it is desirable to recognize previously unknown malicious code.

In some instances, malware may be designed to avoid detection. For example, malware may be designed to load into memory before malware detection software starts during a boot-up phase. Malware may be designed to integrate into an operating system present on an infected machine. Malware may bury network communication in apparently benign network communication. Malware may connect to legitimate network endpoints to obscure connections to control servers or other targets. In some instances, malware behaves in an apparently benign manner until a trigger event, e.g., a set day, arrives. In some instances, malware is reactive to environmental conditions. For example, malware may be designed to behave in an apparently benign manner in the presence of malware detection software.

Suspicious computer code may be identified as malware by observing interactions between the suspicious computer code and remote network endpoints. Suspicious computer code may generate or receive data packets via a data network. For example, if a data packet has a source or destination endpoint matching a known command and control ("C&C") server, then the code may be malicious. Likewise, if content of a data packet is consistent with traffic models ("signatures") for the traffic produced by known malicious code, then the code may be malicious. A watch-list of known or suspected malicious servers (e.g., C&C servers) is maintained and a catalog of traffic models is maintained. When a set of communicated data packets is classified as malicious using the watch-list, the catalog is updated with a model of the data packets. When a set of communicated data packets is classified as malicious using the catalog of traffic models, the watch-list is updated with one or more endpoints data from the data packets.

Using the signatures to identify malicious network activities may provide precise detection. However, the signatures are generally built upon traffic models that have been created and lack temporal characteristics. Moreover, the malicious network activities can evolve or vary over time at a rapid pace. Thus, relying solely on such signatures may negatively affect the capability to quickly and effectively identify the malicious network activities. The present disclosure provides various embodiments of systems and methods to solve such a technical problem.

The disclosed system can generate a temporal profile based on one or more seasonalities of network data shared by a number of network nodes. For example, the disclosed system can collect a set of raw network data that a number of network nodes used to communicate with each other during a time duration. In response to collecting the raw network data, the system can identify one or more behaviors and associate the one or more behaviors with respective seasonalities (e.g., day vs. night, work hours vs. breaks, work days vs. weekends). A temporal profile can be generated based on such associations between the behaviors and the seasonalities. The system can communicate, interface, or otherwise integrate with a threat communication system to define, categorize, or otherwise identify characteristics of the behaviors in the temporal profile. For example, some behaviors may be identified as communicating with an unrecognized endpoint during midnights; some behaviors may be identified as communicating with a suspicious endpoint every Monday; and some behaviors may be identified as communicating with a malicious endpoint (a C&C node) every week. Using the temporal profile, the system can determine that some of the behaviors may be anomalous based on the characteristics of the behaviors (e.g., a destination, a source, a signature, etc.) and respective seasonalities. Further, rather than simply identifying an anomalous behavior, the system can pinpoint, determine, or otherwise identify a root cause for the anomalous behavior using the temporal profile. As such, the system cannot only reduce the likelihood of false alarms but also shorten the time for the anomalous (or deemed as malicious) behaviors to be addressed.

FIG. 1 is a block diagram illustrating one embodiment of computing systems in a network environment 100. The network environment 100 can include a plurality of network nodes 102, 104, and 106 communicating with each other and/or one or more remote endpoints 150 via a data network 110. The network environment 100 can include or otherwise interface with a threat detection system 120 and a control system 130. The threat detection system 120 and the control system 130 can observe, monitor, and otherwise mange the communications of the network nodes 102-106. In some embodiments, the threat detection system 120 can store, maintain, or otherwise manage a watch-list of suspect endpoints and a catalog of traffic models characterizing malicious network activities; and the control system 130 can generate a temporal profile based on behaviors and respective seasonalities identified from network data over the network 110 (e.g., raw network data that the network nodes 102-106 communicate with each other and the endpoints 150). Although the threat detection system 120 and the control system 130 are each represented as separate from each of the network nodes 102-106, the threat detection system 120 and the control system 130 can be integrated within each of the network nodes 102-106 itself while remaining within the scope of the present disclosure.

Figure 2:
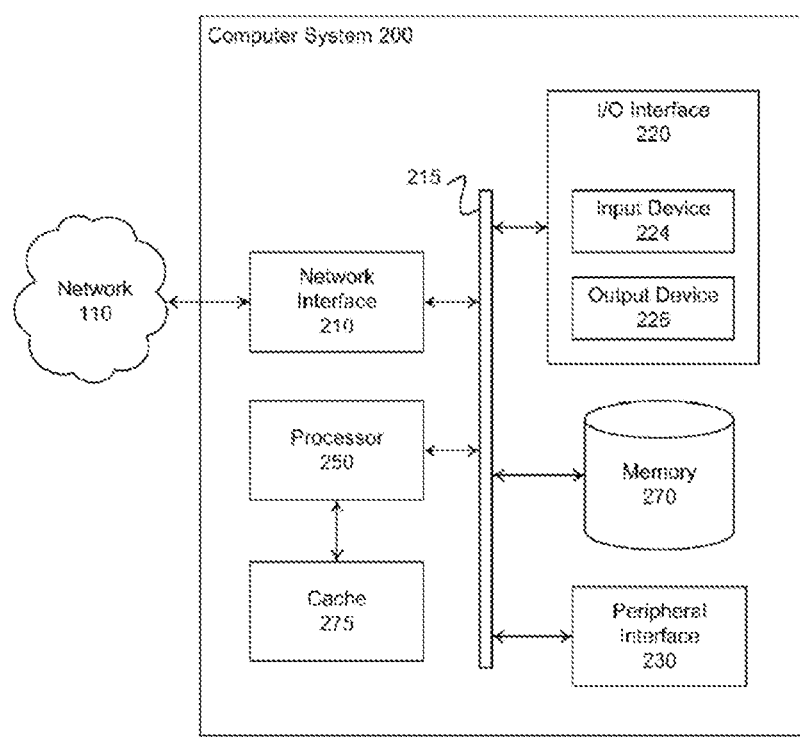
FIG. 2 is a block diagram illustrating one embodiment of a general architecture of a computing device useful in connection with the systems and methods described herein, according to an exemplary embodiment.

Each of the network nodes 102-106 may be any kind of computing device, including but not limited to, a laptop, desktop, tablet, electronic pad, personal digital assistant, smart phone, video game device, television, server, kiosk, or portable computer. In other embodiments, each of the network nodes 102-106 may be a virtual machine. Each of the network nodes 102-106 may be single-core, multi-core, or a cluster. Each of the network nodes 102-106 may operate under the control of an operating system, such as any of the operating systems from Apple, Inc. (e.g., OS X or iOS), from Microsoft, Inc. (e.g., Windows NT, MSCS, Windows XP, Windows Server 2008, Windows Server Failover Clustering, Windows 7, or Windows 8), from Google Inc. (e.g., Chrome OS or Android), or Bell Lab's UNIX and its derivatives (e.g., BSD, FreeBSD, NetBSD, Linux, Solaris, AIX, or HP/UX). Generally, each of the network nodes 102-106 may be any computing system susceptible to infection by malware, that is, any computing system. In some embodiments, each of the network nodes 102-106 is a computing device 200, as illustrated in FIG. 2 and described below.

Each of the network nodes 102-106 may communicate with each other and/or one or more remote endpoints 150 via the data network 110. The network 110 can be a local-area network (LAN), such as a company intranet, a metropolitan area network (MAN), or a wide area network (WAN), such as the Internet and the World Wide Web. The network 110 may be any type and/or form of network and may include any of a point-to-point network, a broadcast network, a wide area network, a local area network, a telecommunications network, a data communication network, a computer network, an asynchronous transfer mode (ATM) network, a synchronous optical network (SONET), a wireless network, an optical fiber network, and a wired network. In some embodiments, there can be multiple networks 110 between participants, for example a smart phone typically communicates with Internet servers via a wireless network connected to a private corporate network connected to the Internet. The network 110 may be public, private, or a combination of public and private networks. The topology of the network 110 may be a bus, star, ring, or any other network topology capable of the operations described herein.

The remote endpoints 150 may be network addressable endpoints. For example, a remote endpoint 150 may be a data server, a web site host, a domain name system (DNS) server, a router, or a personal computing device. A remote endpoint 150 may be represented by a network address, e.g., domain name or an IP address. An Internet Protocol ("IP") address may be an IPv4 address, an IPv6 address, or an address using any other network addressing scheme. In some embodiments, a remote endpoint 150 is an un-resolvable network address, that is, it may be an address that is not associated with a network device. Network communication to an un-resolvable address will fail until a network device adopts the address. For example, malware may attempt to communicate with a domain name that is not in use.

In some embodiments, the threat detection system 120 may be a distinct computing system monitoring the communications between the network nodes 102-106 and the remote endpoints 150. For example, the network nodes 102-106 and the threat detection system 120 may communicate with the network 110 via a shared router or switch. The threat detection system 120 may sniff packets on a local network, e.g., a network within a local computing environment that includes at least the network nodes 102-106 and the threat detection system 120. In some embodiments, the network nodes 102-106 may each be a virtual machine and the threat detection system 120 may be part of the virtual machine monitor ("VMM").

The threat detection system 120 may maintain a watch-list of suspect endpoints and a catalog of traffic models characterizing malicious network activity. Generally, a watch-list of suspect endpoints is a set of addresses corresponding to one or more of the remote endpoints 150 that are suspected of engaging in malicious network activity. For example, an address for a remote endpoint that is identified as a C&C server may be added to a watch-list (sometimes referred to as a "black list"). Network communication routed to or from an endpoint on a watch-list may be blocked to prevent operation of malware, such as a botnet. Generally, a traffic model characterizing malicious network activity may be any information set used to recognize network traffic. An example model for recognizing messages between a specific malware loader, a Pushdo loader, and its associated C&C server, shall be discussed with respect to FIG. 3. Generally, the threat detection system 120 may compare the contents or routing behavior of communications between the network nodes 102-106 and a remote endpoint with the traffic models in the catalog. The threat detection system 120 can identify the behavior of any of the network nodes 102-106 as being anomalous based on determining that a destination of the data packets sent from the network node and/or a source of the data packets received by the network node is on the watch-list or cannot be recognized. Alternatively or additionally, the threat detection system 120 can identify the behavior of any of the network nodes 102-106 as being anomalous based on determining that the data packets collected from the network node sufficiently match at least one of the traffic models in the catalog.

In some embodiments, the control system 130 may be a distinct computing system monitoring the communications between the network nodes 102-106 and the remote endpoints 150. For example, the network nodes 102-106 and the control system 120 may communicate with the network 110 via a shared router or switch. The control system 130 may sniff packets on a local network, e.g., a network within a local computing environment that includes at least the network nodes 102-106 and the control system 130. In some embodiments, the network nodes 102-106 may each be a virtual machine and the control system 130 may be part of the virtual machine monitor ("VMM").

The control system 130 can collect a set of network data communicated by the network nodes (e.g., network nodes 102-106) over the network 110. The set of network data can include at least one of: a plurality of raw data packets over the network 110, respective source IP addresses of the plurality of raw data packets, respective destination IP addresses of the plurality of raw data packets, or respective data sizes of the plurality of raw data packets. The set of network data can also include other metadata, such as the TCP/UDP port number, or the geolocation of the respective source or destination IP addresses. In some embodiments, the control system 130 can collect the network data, which may extend over a certain period of time or a time duration. The time duration can be predefined as a fixed value or dynamically configured as a varying value. In the case of the time duration being a varying value, the control system 130 can determine the value based on, for example, a number of network nodes actively communicating with each other across the network 110, a data size of the network data collected over the network 110, etc.

Upon determining the time duration, the control system 130 can segment the time duration into a plurality of monitoring time periods. The amount of the monitoring time periods can be predefined as a fixed value or dynamically configured as a varying value. In the case of the monitoring time period being a varying value, the control system 130 can determine the value based on, for example, how long the time duration extends, a number of network nodes actively communicating with each other across the network 110, a data size of the network data collected over the network 110, etc. For example, the control system 130 can determine the time duration to be a day and the monitoring period to be an hour. As such, the control system 130 can segment the time duration into 24 monitoring time periods. In another example, the control system 130 can determine the time duration to be 4 work weeks (e.g., Monday to Friday) and the monitoring period to be either work hours (e.g., 8 AM-5 PM every day) or breaks (e.g., 5 PM-8 AM every day). As such, the control system 130 can segment the time duration into 40 monitoring time periods.

Based on a plurality of timestamps included in the set of network data, the control system 130 can group the set of network data into respective subsets of the plurality of monitoring time periods. In some embodiments, the control system 130 can identify, from the set of network data, one or more behaviors performed by one of the network nodes 102-106 and respective timestamp(s). Based on the timestamp(s), the control system 130 can group the set of network data into respective subsets of the monitoring time periods. The control system 130 can determine one or more seasonalities based on an occurrence rate, or occurrence time(s), within each of the subset of the monitoring time periods. The control system 130 can then associate the behaviors with the one or more seasonalities. Continuing with the example where the 4-week time duration over which the network data extends is divided into 40 monitoring periods, the control system 130 can count how many times a certain behavior has been performed (e.g., by one or more of the network nodes 102-106) during each of the 40 monitoring periods to determine the seasonality of the behavior. For instance, the control system 130 can identify that network node 102 has regularly uploaded a fixed size of file or document during the breaks every Monday. In each of the 40 monitoring time periods, the control system 130 can count how many times the network node 102 has performed the behavior. In response to determining the counts, the control system 130 can determine a seasonality to be a recurring time period, e.g., the breaks every Monday, and associate the seasonality with the behavior.

The control system 130 can communicate or interface with the threat detection system 120 to identify, be informed, or otherwise receive one or more behaviors performed by the network nodes 102-106 as being anomalous. Upon identifying the behavior performed by a particular network node, the control system 130 can determine with which of the endpoints and/or network nodes the behavior is intended to communicate. The control system 130 can interface with the threat detection system 120 to determine whether the endpoints and/or network nodes are on the black list, have been recognized as malicious (e.g., associated with a recognized signature), or cannot be recognized.

The control system 130 can generate a temporal profile by associating a number of identified behaviors and respective seasonalities. Further, based on the determination by interfacing with the threat detection system 120, the control system 130 can define, categorize, or otherwise identify the behaviors with their respective characteristics such as, for example, respective destination IP addresses (and whether the IP addresses are associated with malicious endpoints or unrecognized), respective source IP addresses (and whether the IP addresses are associated with malicious endpoints or unrecognized), respective data sizes (and whether the sizes are greater than a predefined threshold), etc. In some implementations, the control system 130 can generate a temporal profile that corresponds to a single host, a group of hosts, or the entire network. In some embodiments, once the control system 130 generates the temporal profile, the control system 130 can transition itself from a data collection mode to an anomaly detection mode. In the data collection mode, the control system 130 can allow the network nodes 102-106 to continue performing the behaviors that the network nodes are currently performing or scheduled to perform; and in the anomaly detection mode, the control system 130 can monitor and intervene with the behaviors that the network nodes are currently performing or scheduled to perform, or cause such behaviors to be intervened with in response to detecting an anomaly. In some embodiments, anomaly detection mode can be a pure detection mode, where the control system 130 can detect anomalies based on observed behaviors without intervention.

The control system 130 can detect anomalies in a single host, group of hosts, or the entire network based on the temporal profiles generated in the detection mode. An anomaly has occurred when the control system 130 determines that the behavior of at least one host falls outside the values in the predicted profile by a certain confidence margin. For example, the detection mode can generate temporal profiles including seasonalities that correspond to safe network behavior (e.g., not communicating with malicious hosts). If the seasonalities begin to deviate from the safe behaviors included in the temporal profiles beyond a certain confidence margin, the control system 130 can identify those behaviors as anomalous. The control system 130 can use a highest magnitude interaction approach to identify the network flows and/or hosts responsible for the identified anomalous behavior. In this way, the control system 130 can not only identify when anomalous communication patterns are occurring in a network, but also the individual hosts and flows responsible for the anomalous behavior, which represents a significant improvement over other solutions.

The control system 130 can capture and analyze network information based on the seasonalities and temporal profiles generated in the anomaly detection mode to determine and identify other malicious hosts. Using the information in the temporal profiles, the control system 130 can compare the patterns of data communication in the network 110, for example between the nodes 102-106, with seasonalities associated with known malicious hosts, for example the hosts blacklisted by the threat detection system 120. The control system 130 can identify and generate a temporal profile based on the seasonalities of communications with a known malicious host. The generated temporal profile can be used as a temporal signature to identify communications between other nodes in the network that may be malicious in nature. For example, the control system 130 can identify an anomalous seasonality where a node communicates 500 bytes to a known malicious host every 30 minutes. This seasonality (500 bytes every 30 minutes) can be compared with the hosts on the network communicating with unknown endpoints. If a communication pattern is sufficiently similar to the seasonality identified in this example, the control system 130 can identify the unknown endpoints as being likely involved in a malware infrastructure, and the unknown endpoints to the black list of infected nodes.

The control system 130 can receive an indication from a third-party that a host on the network 110 as being compromised. The compromised host could be infected with malware or be communicating with a known malicious endpoint. The control system 130 can analyze the network traffic associated with the identified host to identify one or more seasonalities of the network communications. Based on the analysis, the control system 130 can generate a temporal profile for the identified network host that may be used to further diagnose compromised hosts elsewhere in the network. For example, the control system 130 can use the network host to identify other potentially compromised hosts that are communicating in the same manner as the seasonalities that were previously identified for the known compromised host. By tracking these potentially compromised hosts, the control system 130 can determine the behavior of the potential threat as it spreads throughout the network.

The control system 130 can also capture and analyze network information to reduce the number of false positive identifications of malicious activity in the network. For example, the control system 130 can determine that a host is communicating in a seasonal way with an endpoint that is known not to be infected with malware (e.g., a software updating system or a backup system). The control system 130 can generate a temporal signature for this seasonality and compare it to other communication patterns in the network 110 to reduce the false positive identifications in the network, based on the assumption that other hosts communicating with endpoints with the same temporal profile are most likely using the same service, as long as the endpoints are not on the black list of infected hosts. In this way, the control system 130 can reduce the number of false positive identifications of malicious seasonal network behavior, which can significantly improve the performance of the system. The control system 130 can add the endpoints determined to be trusted to a white list of trusted endpoints.

The control system 130 can also provide, to an analyst computing device, any of the identified anomalies along with their identified root causes. The control system 130 may transmit the information associated with the identified anomalies via a computer network, for example network 110. The control system 130 can provide the list of malicious hosts (e.g., the black list) to the analyst computing device, and the list of trusted hosts (e.g., the white list) to the analyst computing device. The control system 130 can provide the root cause (e.g., network flows responsible and/or their associated hosts) of identified anomalous network behaviors to the analyst computing device. The control system 130 can also provide metadata related to each of the anomalies, including host IP information, TCP/UDP port information, timestamps, network flow metadata, and any raw network data collected by the control system 130. The control system 130 can also provide any seasonality information collected to the analyst computing device to, including the seasonality information related to anomalous network activities. The seasonality information can include timestamps, time intervals, data transmission frequency, and other network seasonality information. The control system 130 can also identify and send any of the information communicated as a part of an anomalous network flow, and also identify any communication protocols used to connect any hosts in the network as a part of anomalous activities. This further allows the analyst computing device to triage the identified anomalies and incidents, which can substantially reduce the false positive identification rate of anomalous activities in the network.

In some embodiments, one or more of the systems illustrated in FIG. 1 are constructed to be similar to the computing system 200 of FIG. 2. In some embodiments, a server may be made up of multiple computing systems 200. In some embodiments, a server may be a virtual server, for example, a cloud-based server accessible via the network 110. A cloud-based server may be hosted by a third-party cloud service host. A server may be made up of multiple computing systems 200 sharing a location or distributed across multiple locations. The multiple computing systems 200 forming a server may communicate using the network 110. The multiple computing systems 200 forming a server may communicate using a private network, e.g., a network distinct from a publicly-accessible network or a virtual private network within a publicly-accessible network.

The processor 250 may be any logic circuitry that processes instructions, e.g., instructions fetched from the memory 270 or cache 275. In many embodiments, the processor 250 is a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 200 may be based on any of these processors, or any other processor capable of operating as described herein. The processor 250 may be a single core or multi-core processor. The processor 250 may be multiple processors.

The I/O interface 220 may support a wide variety of devices. Examples of an input device 224 include a keyboard, mouse, touch or track pad, trackball, microphone, touch screen, or drawing tablet. Example of an output device 226 include a video display, touch screen, speaker, inkjet printer, laser printer, dye-sublimation printer, or 3D printer. In some embodiments, an input device 224 and/or output device 226 may function as a peripheral device connected via a peripheral interface 230.

A peripheral interface 230 supports connection of additional peripheral devices to the computing system 200. The peripheral devices may be connected physically, as in a FireWire or universal serial bus (USB) device, or wirelessly, as in a Bluetooth device. Examples of peripherals include keyboards, pointing devices, display devices, audio devices, hubs, printers, media reading devices, storage devices, hardware accelerators, sound processors, graphics processors, antennae, signal receivers, measurement devices, and data conversion devices. In some uses, peripherals include a network interface and connect with the computing system 200 via the network 110 and the network interface 210. For example, a printing device may be a network accessible printer.

The computing system 200 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computing system 200 may comprise a gaming device such as a PlayStation (PS 1/2/3/4/x) or Personal PlayStation Portable (PSP) device manufactured by the Sony Corporation of Tokyo, Japan, a Nintendo, Game Boy, or Wii device manufactured by Nintendo Co., Ltd., of Kyoto, Japan, or an XBox or XBox 360 device manufactured by the Microsoft Corporation of Redmond, Wash. For example, the computing system 200 may comprise a tablet device such as one of the iPad family of devices manufactured by Apple Computer of Cupertino, Calif.

FIG. 3 illustrates an example model for recognizing messages. The traffic model 350 recognizes a communication as part of a malicious network activity. The traffic model 350 may include, for example, control information 362, an alert message 364, patterns for protocol information and routing information 368, content patterns 372, hash values 375, classification information 382, and versioning information 384. In the example traffic model 350 illustrated in FIG. 3, a regular expression 372 matches content for a Pushdo loader and a message digest 375 that characterizes the binary program that generated the traffic. The Pushdo loader is malware that is used to install (or load) modules for use of an infected machine as a bot. For example, Pushdo has been used to load Cutwail and create large numbers of spam bots. The traffic model 350 for recognizing Pushdo is provided as an example signature.

Generally, the threat detection system 120 may compare the contents or routing behavior of communications between the network nodes 102-106 and the remote endpoints 150 with a traffic model 350, e.g., as found in a catalog of traffic models characterizing malicious network activity. A traffic model 350 may be generated for traffic known to be malicious network activity by identifying characteristics of the network traffic. The traffic model 350 is a type of "signature" for the identified malicious network activity.

A regular expression 372 may be used to identify suspect network communication. A regular expression may be expressed in any format. One commonly used set of terminology for regular expressions is the terminology used by the programming language Perl, generally known as Perl regular expressions, "Perl RE," or "Perl RegEx." (POSIX BRE is also common). Network communications may be identified as matching a traffic model 350 if a communication satisfies the regular expression 372 in the traffic model 350. A regular expression to match a set of strings may be generated automatically by identifying common patterns across the set of strings and generating a regular expression satisfied by a common pattern. In some embodiments, other characteristics are used as a model. For example, in some embodiments, packet length, number of packets, or repetition of packets is used as a model. In some embodiments, content repetition within a packet is used as a model. In some embodiments, timing of packets is used as a model.

A message digest 375 may be used to characterize a block of data, e.g., a binary program. One commonly used message digest algorithm is the "md5 hash" algorithm created by Dr. Rivest. In some embodiments, network communications may be identified if a message digest for a program generating or receiving the communication is equivalent to the message digest 375 in the traffic model 350.

Control information 362 may be used to control or configure use of the traffic model. The example traffic model illustrated in FIG. 3 is applied to TCP flows using port $HTTP_PORTS, e.g., 80, 443, or 8080.

An alert message 364 may be used to signal an administrator that the traffic model has identified suspect network traffic. The alert message 364 may be recorded in a log. The alert message 364 may be transmitted, e.g., via a text message or e-mail. The alert message 364 may be displayed on a screen. In some embodiments, a generic alert message is used. In some embodiments, an alert message is generated based on available context information.

Patterns for protocol information and routing information 368 may indicate various protocols or protocol indicators for the traffic model. For example, as illustrated in FIG. 3, the Pushdo traffic uses the HTTP protocol.

Classification information 382 may be used to indicate the type of suspect network activity. For example, as illustrated in FIG. 3, Pushdo is a Trojan. Other classifications may include: virus, worm, drive-by, or evasive.

Versioning information 384 may be used to assign an identifier (e.g., signature ID) and or a version number for the traffic model.

Figure 4:
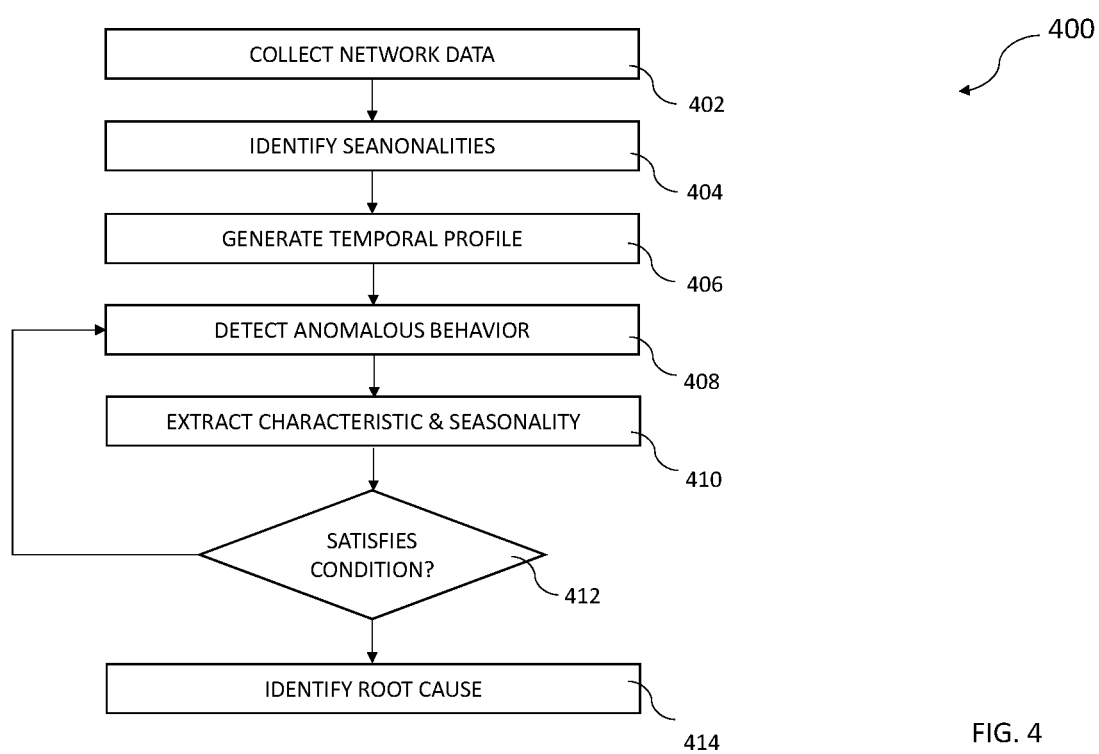
FIG. 4 is a flow diagram of a method for detecting anomalous behaviors based on a temporal profile, according to an exemplary embodiment.

Referring now to FIG. 4, FIG. 4 illustrates a method 400 for detecting anomalous behaviors based on a temporal profile, in accordance with one or more embodiments. Operations of the method 400 presented below are intended to be illustrative. In some embodiments, the method 400 may be accomplished with one or more additional operations not described, and/or without one or more of the operations discussed. Additionally, the order in which the operations of the method 400 as illustrated in FIG. 4 and described below is not intended to be limiting.

In some embodiments, the method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 400 in response to instructions stored electronically on an electronic storage medium. The one or more processing devices may include one or more devices configured through hardware, firmware, and/or software to be specifically designed for execution of one or more of the operations of the method 400.

In brief overview, the method 400 may include collecting a set of network data (BLOCK 402). The method 400 may include identifying one or more seasonalities (BLOCK 404). The method 400 may include generating a temporal profile (BLOCK 406). The method 400 may include detecting an anomalous behavior (BLOCK 408). The method 400 may include extracting a characteristic and a seasonality (BLOCK 410). The method 400 may include a determination as of whether the anomalous behavior satisfies a threshold (BLOCK 412). The method 400 may include identifying a root cause for the anomalous behavior (BLOCK 414).

In further detail, the method 400 may include collecting a set of network data (BLOCK 402). In some embodiments, a control system (e.g., 130) can collect a set of network data communicated by network nodes over a network (e.g., the network nodes 102-106 over the network 101). The set of network data can include at least one of: a plurality of raw data packets over the network 110, respective source IP addresses of the plurality of raw data packets, respective destination IP addresses of the plurality of raw data packets, or respective data sizes of the plurality of raw data packets. In some embodiments, the control system 130 can collect the network data, which may extend over a certain period of time or a time duration.

The method 400 may include identifying one or more seasonalities (BLOCK 404). Based on a plurality of timestamps included in the set of network data, the control system 130 can group the set of network data into respective subsets of monitoring time periods. In some embodiments, the control system 130 can identify, from the set of network data, one or more behaviors performed by one of the network nodes 102-106 and respective timestamp(s). Based on the timestamp(s), the control system 130 can group the set of network data into respective subsets of the monitoring time periods. The control system 130 can determine one or more seasonalities based on an occurrence rate, or occurrence time(s), within each of the subset of the monitoring time periods. The control system 130 can then associate the behaviors with the one or more seasonalities.

The method 400 may include generating a temporal profile (BLOCK 406). In some embodiments, the control system 130 can generate a temporal profile based on the one or more identified seasonalities. The control system 130 can generate the temporal profile by associating the identified behaviors with the respective seasonalities. While identifying the behaviors to be included in the temporal profile, the control system 130 can interface with a threat detection system (e.g., 120) to identify respective characteristics of the behaviors. The characteristic can include respective destination IP addresses (and whether the IP addresses are associated with malicious endpoints or unrecognized) of the behaviors, respective source IP addresses (and whether the IP addresses are associated with malicious endpoints or unrecognized) of the behaviors, respective data sizes (and whether the sizes are greater than a predefined threshold) of the behaviors, etc.

The method 400 may include detecting an anomalous behavior (BLOCK 408). In some embodiments, once the control system 130 generates the temporal profile, the control system 130 can switch to an anomaly detection mode. In such a mode, the control system 130 may detect whether any of the behaviors in the temporal profile and/or whether any of the behaviors that the network nodes 102-104 is performing is anomalous based on the temporal profile. In some embodiments, the control system 130 can determine a behavior as being anomalous based on the detected characteristic and seasonality, which shall be discussed as follows.

The method 400 may include extracting respective characteristic and seasonality of each of the behaviors (BLOCK 410). The control system 130 can extract, from the temporal profile, the respective characteristic and seasonality of each of the behaviors to determine whether the behavior shall be categorized as being anomalous. The control system 130 can determine the behavior as being anomalous based on determining whether the characteristic and seasonality satisfy a condition (BLOCK 412). The control system 130 can predefine the condition to include at least one of: (a) whether the characteristic is associated with a malicious endpoint/network node; (b) whether the characteristic is associated with an unrecognized endpoint/network node; (c) whether the characteristic is associated with a recurring time period; or (d) whether the seasonality deviates from the expected temporal profile established by the control system 130. If not, the method 400 may proceed again to BLOCK 408 to detect another anomalous behavior; and if so, the method 400 may proceed to BLOCK 414 to identify a root cause for the anomalous behavior.

The method 400 may also include providing information related to the detected anomalous behavior and the identified root cause of the detected anomalous behavior to an analyst computing device. The information related to the anomalous behavior can include seasonality information, timestamps, network flow metadata, hosts identified that are associated with the anomalous network behavior, and the data transmitted as a part of the anomalous behavior. The information can be transmitted via a computer network, for example the network 110. The analyst computing device can triage the identified anomalies and incidents.

In an example, the control system 130 can determine, from the temporal profile, that the characteristic of an identified behavior (e.g., a destination IP addresses) corresponds to an endpoint that was not previously identified and the seasonality does not conform to the expected temporal profiles established in the detection mode. In this case, the control system 130 can determine the at least one of the predefined conditions is satisfied, and thus, the control system 130 can determine the behavior as anomalous. Further, the control system 130 can determine the hosts and/or network flows responsible for the anomalous behavior using highest magnitude interaction analysis. In another example, the control system 130 can determine, from the temporal profile, that the characteristic of an identified behavior (e.g., a source IP addresses) corresponds to an endpoint that was previously identified as suspicious or malicious (e.g., on the black list) and the seasonality corresponds to a recurring time period (e.g., every 20 hours, every week, etc.). The control system 130 can determine that at least one of the characteristic and seasonality satisfy the predefined conditions, and thus, the control system 130 may determine the behavior as anomalous. Further, the control system 130 can pinpoint the root cause (e.g., the specific network flows and/or hosts responsible for the anomaly) by using highest magnitude interaction analysis on the network behavior. In yet another example, the control system 130 can determine, from the temporal profile, that the characteristic of an identified behavior (e.g., a destination IP addresses) corresponds to an endpoint that was previously identified as suspicious or malicious (e.g., on the black list) and the seasonality corresponds to a recurring time period (e.g., every 20 hours, every week, etc.). The control system 130 can determine that at least one of the characteristic and seasonality satisfy the predefined conditions, and thus, the control system 130 may determine the behavior as anomalous. Further, the control system 130 can pinpoint the root cause why such a behavior is deemed as anomalous by specifying the suspicious endpoint and recurring time period.

It should be understood that the systems and methods described above may be provided as instructions in one or more computer programs recorded on or in one or more articles of manufacture, e.g., computer-readable media. The article of manufacture may be a floppy disk, a hard disk, a CD-ROM, a flash memory card, a PROM, a RAM, a ROM, or a magnetic tape. In general, the computer programs may be implemented in any programming language, such as LISP, Perl, Python, C, C++, C#, PROLOG, or in any byte code language such as JAVA. The software programs may be stored on or in one or more articles of manufacture as object code.

Having described certain embodiments of methods and systems, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for monitoring a network, comprising:
    collecting, by a control system comprising a processor and memory, a set of network data communicated by a plurality of network nodes over a network during a time duration;
    segmenting, by the control system, the time duration into a plurality of monitoring time periods;
    grouping, by the control system and based on a plurality of timestamps of the set of network data, the set of network data into respective subsets of the plurality of monitoring time periods;
    identifying, by the control system, one or more seasonalities from the set of network data based on an occurrence rate associated with each of the subsets of the plurality of monitoring time periods;
    generating, by the control system, a temporal profile based on the one or more identified seasonalities;
    detecting, by the control system and based on the temporal profile, an anomalous behavior performed by one of the plurality of network nodes; and
    identifying, by the control system and based on the temporal profile, a root cause for the anomalous behavior.

2. The method of claim 1, further comprising:
    switching, by the control system, from a data collection mode to an anomaly detection mode in response to the generation of the temporal profile.

3. The method of claim 1, wherein the set of network data includes at least one of: a plurality of raw data packets over the network, respective source IP addresses of the plurality of raw data packets, respective destination IP addresses of the plurality of raw data packets, respective source TCP ports of the plurality of raw data packets, respective destination TCP ports of the plurality of raw data packets, respective source UDP ports of the plurality of raw data packets, respective destination UDP ports of the plurality of raw data packets, and respective data sizes of the plurality of raw data packets.

4. The method of claim 1, wherein identifying a root cause for the anomalous behavior further comprises:
    determining, by the control system, a network flow associated with the anomalous behavior using highest magnitude interaction analysis; and
    identifying, by the control system, the network nodes associated with the network flow.

5. The method of claim 1, wherein detecting an anomalous behavior performed by one of the plurality of network nodes further comprises:
    collecting, by the control system, a second set of network data communicated by the plurality of network nodes over the network during a second time duration;
    identifying, by the control system, one or more detection mode seasonalities from the second set of network data;
    comparing, by the control system, the detection mode seasonalities with the temporal profile to calculate a confidence margin; and
    detecting, by the control system, an anomalous behavior based on the calculated confidence margin exceeding a predetermined threshold.

6. The method of claim 1, further comprising:
    identifying, by the control system, from the set of network data, a network communication between two network nodes, wherein at least one of the network nodes is on a list of known malicious network nodes;
    identifying, by the control system, one or more malicious seasonalities of the identified network communication; and
    generating, by the control system, a malicious temporal profile based on the one or more identified malicious seasonalities;
    comparing, by the control system, the one or more seasonalities to the malicious temporal profile to determine a malicious network communication with an unknown network node; and
    adding, by the control system, the unknown network node to the list of known malicious network nodes.

7. The method of claim 1, further comprising:
    identifying, by the control system, from the set of network data, a network communication between two network nodes, wherein at least one of the network nodes is on a list of known trusted network nodes;
    identifying, by the control system, one or more trusted seasonalities of the identified network communication;
    generating, by the control system, a trusted temporal profile based on the one or more identified trusted seasonalities;
    comparing, by the control system, the one or more seasonalities to the trusted temporal profile to determine a trusted network communication with an unknown network node; and
    adding, by the control system, the unknown network node to the list of known trusted network nodes.

8. A computing device comprising:
    a memory; and one or more processors operatively coupled to the memory, the one or more processors being to:
  collect a set of network data communicated by a plurality of network nodes over a network during a time duration;
  segment, by the control system, the time duration into a plurality of monitoring time periods;
  group, by the control system and based on a plurality of timestamps of the set of network data, the set of network data into respective subsets of the plurality of monitoring time periods;
  identify one or more seasonalities from the set of network data based on an occurrence rate associated with each of the subsets of the plurality of monitoring time periods;
  generate a temporal profile based on the one or more identified seasonalities;
  detect, based on the temporal profile, an anomalous behavior performed by one of the plurality of network nodes; and
  identify, based on the temporal profile, a root cause for the anomalous behavior.

9. The computing device of claim 8, wherein the one or more processors are further to switch from a data collection mode to an anomaly detection mode in response to the generation of the temporal profile.

10. The computing device of claim 8, wherein the set of network data includes at least one of: a plurality of raw data packets over the network, respective source IP addresses of the plurality of raw data packets, respective destination IP addresses of the plurality of raw data packets, respective source TCP ports of the plurality of raw data packets, respective destination TCP ports of the plurality of raw data packets, respective source UDP ports of the plurality of raw data packets, respective destination UDP ports of the plurality of raw data packets, and respective data sizes of the plurality of raw data packets.

11. The computing device of claim 8, wherein the one or more processors are further to:
  determine a network flow associated with the anomalous behavior using highest magnitude interaction analysis; and
  identify the network nodes associated with the network flow.

12. The computing device of claim 8, wherein the one or more processors are further to:
  collect a second set of network data communicated by the plurality of network nodes over the network during a second time duration;
  identify one or more detection mode seasonalities from the second set of network data;
  compare the detection mode seasonalities with the temporal profile to calculate a confidence margin; and
  detect an anomalous behavior based on the calculated confidence margin exceeding a predetermined threshold.

13. The computing device of claim 8, wherein the one or more processors are further to:
  identify, from the set of network data, a network communication between two network nodes, wherein at least one of the network nodes is on a list of known malicious network nodes;
  identify one or more malicious seasonalities of the identified network communication; and
  generate a malicious temporal profile based on the one or more identified malicious seasonalities;
  compare the one or more seasonalities to the malicious temporal profile to determine a malicious network communication with an unknown network node; and
  add the unknown network node to the list of known malicious network nodes.

14. The computing device of claim 8, wherein the one or more processors are further to:
  identify, from the set of network data, a network communication between two network nodes, wherein at least one of the network nodes is on a list of known trusted network nodes;
  identify one or more trusted seasonalities of the identified network communication;
  generate a trusted temporal profile based on the one or more identified trusted seasonalities;
  compare the one or more seasonalities to the trusted temporal profile to determine a trusted network communication with an unknown network node; and
  add the unknown network node to the list of known trusted network nodes.

15. A non-transitory computer readable medium storing program instructions for causing one or more processors to:
  collect a set of network data communicated by a plurality of network nodes over a network during a time duration;
  segment, by the control system, the time duration into a plurality of monitoring time periods;
  group, by the control system and based on a plurality of timestamps of the set of network data, the set of network data into respective subsets of the plurality of monitoring time periods;
  identify one or more seasonalities from the set of network data based on an occurrence rate associated with each of the subsets of the plurality of monitoring time periods;
  generate a temporal profile based on the one or more identified seasonalities;
  detect, based on the temporal profile, an anomalous behavior performed by one of the plurality of network nodes; and
  identify, based on the temporal profile, a root cause for the anomalous behavior.

16. The non-transitory computer readable medium of claim 15, wherein the program instructions further cause the one or more processors to:
  collect a second set of network data communicated by the plurality of network nodes over the network during a second time duration;
  identify one or more detection mode seasonalities from the second set of network data;
  compare the detection mode seasonalities with the temporal profile to calculate a confidence margin; and
  detect an anomalous behavior based on the calculated confidence margin exceeding a predetermined threshold.

17. The non-transitory computer readable medium of claim 15, wherein the program instructions further cause the one or more processors to:
  identify, from the set of network data, a network communication between two network nodes, wherein at least one of the network nodes is on a list of known malicious network nodes;
  identify one or more malicious seasonalities of the identified network communication;
  generate a malicious temporal profile based on the one or more identified malicious seasonalities;

compare the one or more seasonalities to the malicious temporal profile to determine a malicious network communication with an unknown network node; and add the unknown network node to the list of known malicious network nodes.

18. The non-transitory computer readable medium of claim 15, wherein the program instructions further cause the one or more processors to:

identify, from the set of network data, a network communication between two network nodes, wherein at least one of the network nodes is on a list of known trusted network nodes;

identify one or more trusted seasonalities of the identified network communication;

generate a trusted temporal profile based on the one or more identified trusted seasonalities;

compare the one or more seasonalities to the trusted temporal profile to determine a trusted network communication with an unknown network node; and add the unknown network node to the list of known trusted network nodes.

19. The non-transitory computer readable medium of claim 15, wherein the one or more processors are further to switch from a data collection mode to an anomaly detection mode in response to the generation of the temporal profile.

20. The non-transitory computer readable medium of claim 15, wherein the program instructions further cause the one or more processors to:

determine a network flow associated with the anomalous behavior using highest magnitude interaction analysis; and identify the network nodes associated with the network flow.

* * * * *